(12) United States Patent
Boen

(10) Patent No.: US 9,309,386 B2
(45) Date of Patent: Apr. 12, 2016

(54) SIDEWALL SUPPORT FOR A RUN FLAT TIRE

(71) Applicants: Compagnie Generale des Etablissements Michelin, Clermont-Ferrand (FR); Michelin Recherche et Technique S.A., Granges-Paccot (CH)

(72) Inventor: Sik Boen, Greenville, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 14/654,885

(22) PCT Filed: Dec. 23, 2013

(86) PCT No.: PCT/US2013/077454
§ 371 (c)(1),
(2) Date: Jun. 23, 2015

(87) PCT Pub. No.: WO2014/105811
PCT Pub. Date: Jul. 3, 2014

(65) Prior Publication Data
US 2015/0344680 A1    Dec. 3, 2015

Related U.S. Application Data

(60) Provisional application No. 61/746,196, filed on Dec. 27, 2012.

(51) Int. Cl.
*B60C 1/00*   (2006.01)
*C08L 9/00*   (2006.01)
*C08L 7/00*   (2006.01)

(52) U.S. Cl.
CPC .... *C08L 9/00* (2013.01); *C08L 7/00* (2013.01)

(58) Field of Classification Search
CPC .................................... C08L 9/00; C08L 7/00
See application file for complete search history.

(56) References Cited

U.S. PATENT DOCUMENTS

| | | | |
|---|---|---|---|
| 5,798,405 A | 8/1998 | Zimmer et al. | |
| 6,022,434 A | 2/2000 | Williard, Jr. et al. | |
| 7,337,815 B2 | 3/2008 | Spadone et al. | |
| 7,789,119 B2 | 9/2010 | Agostini et al. | |
| 8,071,671 B2 | 12/2011 | Hogan et al. | |
| 2002/0036043 A1* | 3/2002 | Thielen et al. | B60C 1/0025 152/517 |
| 2009/0101263 A1 | 4/2009 | Nakamura | |
| 2012/0234452 A1* | 9/2012 | Miyazaki | B60C 1/00 152/541 |

OTHER PUBLICATIONS

Brad Thompson Thermax N990 Medium Thermal Carbon Black in Nitirle Rubber Compounds, Cancarb, Apr. 29, 2010, pp. 1-8.*
International Search Report with Written Opinion dated Apr. 29, 2014.

* cited by examiner

*Primary Examiner* — Alexander Kollias
(74) *Attorney, Agent, or Firm* — Frank J. Campigotto

(57) ABSTRACT

Particular embodiments include run-flat tires having sidewall supports that are manufactured from a rubber composition that is based upon a tin end-functionalized polybutadiene rubber as well as an additional second rubber component and a mixture of carbon blacks. The first carbon black may be characterized as being a low-surface area, high-structure carbon black and the second carbon black may be characterized as a low-surface area carbon black. The low-surface area, high-structure carbon black may be added to the rubber composition in an amount that provides a modulus of elongation at 10% measured at 23° C. of between 8 MPa and 10 MPa.

20 Claims, No Drawings

SIDEWALL SUPPORT FOR A RUN FLAT TIRE

BACKGROUND OF THE INVENTION

1. Field of the Invention

This invention relates generally to tires and more specifically, materials for forming sidewall supports in a tire and such supports.

2. Description of the Related Art

Tire manufacturers have been developing solutions for how passengers in vehicles having pneumatic tires can continue on their journey for at least some minimum distance upon a tire losing all or substantially all of its pressure. While spare tires are one solution for such a problem, a better solution would allow the passengers to continue without having to get out of their vehicle until reaching a safe destination.

The idea of extended mobility allows a vehicle to continue to drive along on a tire that has lost all or substantially all of its inflation for at least a reasonable distance. Such tires, based on run-flat technology, often include a self-supporting feature that allows the tires to support a significant load at reduced pressure or even no pressure. Such self-supporting feature may include a tire sidewall that is reinforced with rubber inserts as shown, for example, in U.S. Pat. No. 6,022,434, which is hereby fully incorporated by reference.

Because the rubber inserts have to be able to support the load of the vehicle at a reduced or no inflation pressure, these inserts are often quite thick and they typically impact the rolling resistance characteristics of the tire. Researchers in the tire industry are searching for new materials and new designs for such sidewall supports to improve the rolling resistance of such tires and their durability when operated under no or little pressure.

SUMMARY OF THE INVENTION

Particular embodiments of the present invention include run-flat tires having sidewall supports that are manufactured from a rubber composition that is based upon a cross-linkable elastomer composition. For example, the cross-linkable elastomer composition may include a tin end-functionalized polybutadiene rubber as well as an additional second rubber component. The cross-linkable elastomer composition may further include a first carbon black and a second carbon black, the first carbon black characterized as being a low-surface area, high-structure carbon black and the second carbon black being characterized as a low-surface area carbon black.

In particular embodiments, the first carbon black may have a nitrogen surface area of between 15 $m^2/g$ and 25 $m^2/g$ and a COAN of between 65 ml/100 g and 85 ml/100 g while the second carbon black may have a nitrogen surface area of between 2 $m^2/g$ and 11 $m^2/g$. The total loading of the first and second carbon blacks may range, for example, between 70 phr and 120 phr with the first carbon black providing between 20 wt. % and 90 wt. % of the total carbon black loading. The first carbon black may be added in an amount that provides a modulus of elongation at 10% measured at 23° C. of between 8 MPa and 10 MPa.

In particular embodiments the second rubber component may be selected from polybutadienes (BR), polyisoprenes (IR), natural rubber (NR), butadiene copolymers, isoprene copolymers and mixtures of these elastomers.

DETAILED DESCRIPTION OF PARTICULAR EMBODIMENTS

Particular embodiments of the present invention include sidewall supports and materials from which they may be manufactured, the sidewall supports being useful in tires and especially in pneumatic tires that are designed to operate for at least a reasonable distance with little or no inflation pressure. The sidewall supports disclosed herein may be described as having high rigidity and low hysteresis, a combination of attributes that provide a run-flat tire that has improved rolling resistance and improved durability over the other tires now known in the industry.

It is known in the industry that tire designers must often compromise on certain characteristics of the tires they are designing. Changing a tire design to improve one characteristic of the tire will often result in a compromise, i.e., an offsetting decline in another tire characteristic. One such compromise exists between rigidity and hysteresis. When the rigidity of a rubber composition is increased by adding a greater amount of reinforcing filler, such as a carbon black, then the hysteresis of the material also increases.

To achieve a tire sidewall support having high rigidity and low hysteresis, the inventors have discovered that using a rubber composition for the manufacture of the sidewall support having a mix of carbon blacks with specific characteristics and a functionalized elastomer surprisingly breaks the compromise between increased rigidity and hysteresis. The inventors have been able to provide a rigid sidewall support for use in a run-flat tire that may be characterized as having both high rigidity and low hysteresis.

For the design of such a sidewall support, using a material having high rigidity may allow for the manufacture of a narrower and smaller sidewall support than would be possible with a material having low rigidity. A run-flat tire having a narrower and smaller sidewall support may typically have improved rolling resistance. Likewise, using a material having low hysteresis may provide a more durable side support since the heat generation under the run-flat conditions may be less. Furthermore, the sidewall support made from a material having low hysteresis may also typically have improved rolling resistance under normal (i.e., not run-flat) running conditions. Fuel economy is typically improved when vehicles use tires having low rolling resistance.

Therefore, the improved characteristics of rolling resistance and durability of the tires having the sidewall supports described herein were surprisingly obtained by the combination of materials utilized in the rubber composition used for manufacturing the sidewall supports. Particular embodiments of such rubber compositions include those comprising a functionalized polybutadiene rubber, a non-functionalized rubber and a mixture of carbon black fillers, the first carbon black characterized as being a high-structure, low-surface area carbon black and the second carbon black characterized as having a very low surface area.

As used herein, "phr" is "parts per hundred parts of rubber by weight" and is a common measurement in the art wherein components of a rubber composition are measured relative to the total weight of rubber in the composition, i.e., parts by weight of the component per 100 parts by weight of the total rubber(s) in the composition.

As used herein, elastomer and rubber are synonymous terms.

As used herein, "based upon" is a term recognizing that embodiments of the present invention are made of vulcanized or cured rubber compositions that were, at the time of their assembly, uncured. The cured rubber composition is therefore "based upon" the uncured rubber composition. In other words, the cross-linked rubber composition is based upon or comprises the constituents of the cross-linkable rubber composition.

Reference will now be made in detail to embodiments of the invention. Each example is provided by way of explanation of the invention. For example, features illustrated or described as part of one embodiment can be used with another embodiment to yield still a third embodiment. It is intended that the present invention include these and other modifications and variations.

Use of sidewall supports in the sidewalls of tires designed to run for a reasonable distance under low or no-inflation pressure, i.e., run-flat tires, are well known in the industry. Often these sidewall supports are crescent-shaped and they are designed to allow the run-flat tire to support the load of the vehicle for a reasonable distance so that the car can reach a safer location for changing and/or inflating the tire.

It is recognized that the size, thickness and other dimensions of such sidewall supports may vary based, inter alia, on the size and type of the tire and the load that the tire needs to support while in the run-flat condition. It is recognized that one having ordinary skill in the tire design field can design of a run-flat tire with the sidewall supports manufactured with the materials disclosed herein.

As noted above, particular embodiments of the present invention include sidewall supports and tires having such sidewall supports manufactured from a rubber composition that includes an end-functionalized polybutadiene rubber and a second rubber component as well as a at least two different carbon blacks used as reinforcement fillers in the rubber composition. The end-functionalized polybutadiene is functionalized with tin.

Polybutadiene rubber is a well-known rubber that is made by polymerizing the 1,3-butadiene monomer. Because of the two double bonds present in the butadiene monomer, the resulting polybutadiene may include three different forms: cis-1,4, trans-1,4 and vinyl-1,2 polybutadiene. The cis-1,4 and trans-1,4 elastomers are formed by the monomers connecting end-to-end while the vinyl-1,2 elastomer is formed by the monomers connecting between the ends of the monomer.

The tin end-functionalized polybutadiene useful in embodiments of the rubber composition disclosed herein may be obtained by polymerizing the 1,3-butadiene monomers by a lithium initiator and then adding a tin compound as is well known in the art. The resulting polybutadiene is functionalized so that at least a portion of the ends of the chains are terminated with a tin-carbon bond. Typically initiating the polymerization reaction with the lithium initiator results in a polybutadiene having a low cis-1,4 content.

In particular embodiments of the rubber compositions disclosed herein, the tin atom content of the tin end-functionalized polybutadiene may be greater than 30 ppm or greater than 50 ppm. Alternatively the tin atom content may be between 30 ppm and 500 ppm or alternatively, between 50 ppm and 400 ppm or between 60 ppm and 300 ppm. In other embodiments, the tin atom content may be greater or less than these alternative ranges depending upon the needs and anticipated use of the resulting rubber composition.

It may be noted that in particular embodiments the polydispersity index of the polybutadiene is less than 2.5 or alternatively less than 2, between 1 and 2.5 or between 1 and 2. The polydispersity index is defined as the ratio of the weight average molecular weight (Mw) to the number average molecular weight (Mn). As is well known, the Mw and the Mn may be determined relative to polystyrene standards using gel permeation chromatography (GPC).

Such tin end-functionalized polybutadienes are available on the market, one example being NIPOL BR 1250H, available from Zeon Corporation with offices in Tokyo.

In addition to the functionalized polybutadiene, the rubber compositions disclosed herein further include a second rubber component resulting at least in part, i.e., a homopolymer of a copolymer, from diene monomers, i.e., monomers having two double carbon-carbon bonds, whether conjugated or not.

These diene elastomers may be classified as either "essentially unsaturated" diene elastomers or "essentially saturated" diene elastomers. As used herein, essentially unsaturated diene elastomers are diene elastomers resulting at least in part from conjugated diene monomers, the essentially unsaturated diene elastomers having a content of such members or units of diene origin (conjugated dienes) that is at least 15 mol. %. Within the category of essentially unsaturated diene elastomers are highly unsaturated diene elastomers, which are diene elastomers having a content of units of diene origin (conjugated diene) that is greater than 50 mol. %.

Those diene elastomers that do not fall into the definition of being essentially unsaturated are, therefore, the essentially saturated diene elastomers. Such elastomers include, for example, butyl rubbers and copolymers of dienes and of alpha-olefins of the EPDM type. These diene elastomers have low or very low content of units of diene origin (conjugated dienes), such content being less than 15 mol. %.

Examples of suitable conjugated dienes include, in particular, 1,3-butadiene, 2-methyl-1,3-butadiene, 2,3-di($C_1$-$C_5$ alkyl)-1,3-butadienes such as, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Examples of vinyl-aromatic compounds include styrene, ortho-, meta- and para-methylstyrene, the commercial mixture "vinyltoluene", para-tert-butylstyrene, methoxystyrenes, chloro-styrenes, vinylmesitylene, divinylbenzene and vinyl naphthalene.

The copolymers may contain between 99 wt. % and 20 wt. % of diene units and between 1 wt. % and 80 wt. % of vinyl-aromatic units. The elastomers may have any microstructure, which is a function of the polymerization conditions used, in particular of the presence or absence of a modifying and/or randomizing agent and the quantities of modifying and/or randomizing agent used. The elastomers may, for example, be block, random, sequential or microsequential elastomers, and may be prepared in dispersion or in solution; they may be coupled and/or starred or alternatively functionalized with a coupling and/or starring or functionalizing agent.

Examples of suitable diene elastomers include polyisoprenes and butadiene/styrene copolymers, particularly those having a styrene content of between 5 wt. % and 50 wt. % or of between 20 wt. % and 40 wt. % and in the butadiene faction, a content of 1,2-bonds of between 4 mol. % and 65 mol. %, a content of trans-1,4 bonds of between 20 mol. % and 80 mol. %. Also included are butadiene/isoprene copolymers, particularly those having an isoprene content of between 5 wt. % and 90 wt. % and a glass transition temperature (Tg, measured in accordance with ASTM D3418) of −40° C. to −80° C.

Further included are isoprene/styrene copolymers, particularly those having a styrene content of between 5 wt. % and 50 wt. % and a Tg of between −25° C. and −50° C. In the case of butadiene/styrene/isoprene copolymers, examples of those which are suitable include those having a styrene content of between 5 wt. % and 50 wt. % and more particularly between 10 wt. % and 40 wt. %, an isoprene content of between 15 wt. % and 60 wt. %, and more particularly between 20 wt. % and 50 wt. %, a butadiene content of between 5 wt. % and 50 wt. % and more particularly between 20 wt. % and 40 wt. %, a content of 1,2-units of the butadiene fraction of between 4 wt.

% and 85 wt. %, a content of trans-1,4 units of the butadiene fraction of between 6 wt. % and 80 wt. %, a content of 1,2-plus 3,4-units of the isoprene fraction of between 5 wt. % and 70 wt. %, and a content of trans-1,4 units of the isoprene fraction of between 10 wt. % and 50 wt. %, and more generally any butadiene/styrene/isoprene copolymer having a Tg of between −20° C. and −70° C.

In summary, suitable diene elastomers as the second rubber component for particular embodiments of the present invention include highly unsaturated diene elastomers such as polybutadienes (BR), polyisoprenes (IR), natural rubber (NR), butadiene copolymers, isoprene copolymers and mixtures of these elastomers. Such copolymers include butadiene/styrene copolymers (SBR), isoprene/butadiene copolymers (BIR), isoprene/styrene copolymers (SIR) and isoprene/butadiene/styrene copolymers (SBIR). In particular embodiments, the second rubber component is limited to NR.

Particular embodiments of the rubber compositions disclosed herein may include only one diene elastomer in addition to the tin end-functionalized elastomer and/or a mixture of several diene elastomers in addition to the tin end-functionalized elastomer. It may be noted that particular embodiments may contain only highly unsaturated elastomers with other types of elastomers being explicitly excluded.

The rubber compositions that are suitable for manufacturing the sidewall inserts may include, for particular embodiments, between 30 phr and 70 phr of the tin end-functionalized BR or alternatively between 35 phr and 65 phr, between 40 phr and 60 phr or between 45 phr and 55 phr of the tin end-functionalized BR, the remainder of the rubber being the second rubber component. As noted above, in particular embodiments the second rubber component may be limited to NR.

The second rubber component added in particular embodiments of the compositions disclosed herein is included to provide, inter alia, the necessary tack to the rubber composition. Use of a tackifying resin is limited or excluded from particular embodiments because such resins may raise the hysteresis of the rubber composition and increased hysteresis would raise the temperature of the insert under the run-flat running conditions.

In addition to the rubber, the rubber compositions disclosed herein further include at least two different carbon blacks as reinforcing filler. Reinforcing fillers are added to rubber compositions to improve, inter alia, their tensile strength and wear resistance. It has been found by the inventors that the mixture of carbon black reinforcing fillers provides the surprising results that give the higher rigidity and the improved properties of less rolling resistance and improved durability to the tires having the sidewall supports manufactured from the rubber compositions disclosed herein.

Carbon black may best be described as being made up of very fine particulate aggregates wherein the very fine particles are fused together to form the aggregates. The aggregates that are formed by these very fine particles can vary greatly between the different types of carbon blacks. Those blacks having aggregates that have a higher particle count with the particles joined into more chain-like clusters having a narrow core, often with random branching, are characterized as having a higher structure as compared to those in general having a lower particle count, less branched and more compact.

Common properties that are measured and are useful in describing a carbon black include surface area measurements, which are indicative of the particle size and the oil adsorption number (OAN) that is indicative of the structure of the carbon black. A similar test may be performed on a compressed sample of carbon black (COAN) that also provides an indication of the structure of the black. Another common indication of surface area is the iodine number that is a measurement of the adsorption of iodine by the carbon black that provides the measure of the surface area.

One known method of determining the surface area of a carbon black is the ASTM Standard D6556 for determining the total and external surface area by nitrogen adsorption. A method for determining the oil adsorption number is the ASTM Standard D2414 for determining the oil adsorption number using dibutyl phthalate while ASTM Standard D3493 is the standard test for determining the COAN of a carbon black. The iodine number may be determined by ASTM Standards D1510.

Of the two carbon blacks that are included in the rubber compositions disclosed herein, the first carbon black is a high-structure, low-surface area carbon black. Such carbon blacks may be characterized as having a nitrogen surface area as determined using the ASTM Standard D6556 test method of between 15 $m^2/g$ and 25 $m^2/g$ or alternatively, between 17 $m^2/g$ and 22 $m^2/g$. These surface areas are typical for carbon blacks having a low surface area.

In addition to having a low surface area, these carbon blacks useful as the first carbon black for the rubber compositions disclosed herein are also characterized as being of high structure. Useful carbon blacks may further be characterized as having an OAN as determined by ASTM D2414 of between 100 ml/100 g and 150 ml/100 g or alternatively, between 110 ml/100 g and 150 ml/100 g, between 120 ml/100 g and 150 ml/100 g, between 125 ml/100 g and 145 ml/100 g or between 130 ml/100 g and 140 ml/100 g.

In particular embodiments of the rubber compositions disclosed herein, these high-structure, low-surface area carbon blacks may be further characterized as having a COAN as determined by ASTM D3493-09 of between 65 ml/100 g and 85 ml/100 g or alternatively between 70 ml/100 g and 80 ml/100 g.

Useful high-structure, low-surface area carbon blacks for particular embodiments of the rubber compositions disclosed herein may be characterized as having a nitrogen surface area in a range as disclosed above and either a COAN in a range as described above or an OAN in a range as described above to provide a carbon black that may be characterized as having both a low-surface area and a high structure. In other particular embodiments, useful carbon blacks may be characterized as having each of the above characteristics, i.e., nitrogen surface area, OAN and COAN, within a range as described above.

Surface activity of a carbon black may also be indicated by the difference between the nitrogen surface area and the iodine number (ASTM D1510). The iodine number is a measurement of the adsorption of iodine by the carbon black and is also used as a measure of the surface area. Higher activity blacks tend to have a positive difference while less active blacks tend to have a negative number. In particular embodiments, the high-structure, low surface area carbon blacks may have an iodine number of between 10 mg/g and 25 mg/g or alternatively between 15 mg/g and 23 mg/g or 18 mg/g and 21 mg/g and as such may, in particular embodiments, have such difference as positive or alternatively as close to positive. The iodine number may be useful, therefore, to further characterize any of the above described high-structure, low-surface area carbon blacks.

An example of a suitable high-structure, low-surface area carbon black that is available on the market is S204, available from Orion Engineered Carbon with offices in Kingwood, Tex. This carbon black has a nitrogen surface area of 19 m²/g, an OAN of 138 ml/100 g, a COAN of 76 ml/100 g and an iodine number of 19.6 mg/g.

Of the two carbon blacks that are included in the rubber compositions disclosed herein, the second carbon black is a large-particle carbon black having a low-surface area. Particularly useful are thermal blacks and low surface area furnace blacks. Thermal blacks, which are typically manufactured by injecting natural gas into a furnace having very hot refractory walls that decompose the natural gas in the absence of air, are classified as N900 series carbon blacks. Furnace blacks, which are typically manufactured by injecting heavy aromatic oil into a hot gas stream that vaporizes and pyrolyzes the feedstock to form the furnace blacks. Such blacks are typically classified as N100 through N800 series blacks, with the lower series number blacks being those with higher surface areas.

The N-series designations of blacks are numbered in accordance with ASTM D 1765, the Standard Classification System for Carbon Blacks Used in Rubber Products. This standard defines N900 series blacks have an average nitrogen surface area of less than 10 m²/g as measured in accordance with ASTM D 6556. For example, N907 and N990 have nitrogen surface areas of 9 m²/g and 8 m²/g respectively. The standard further defines the N800 series of blacks as having an average nitrogen surface area of between 11 m²/g and 20 m²/g. N100 through N300 blacks, for example, have nitrogen surface areas of between 70 m²/g and 150 m²/g while N500 through N800 blacks have nitrogen surface areas of between 40 m²/g and 11 m²/g.

Low surface area carbon blacks useful for particular embodiments of the rubber compositions disclosed herein are those that have a nitrogen surface area as measured in accordance with ASTM Standard D6556 of between 0 m²/g and 14 m²/g or alternatively between 0 m²/g and 11 m²/g, between 2 m²/g and 11 m²/g or 5 m²/g and 10 m²/g. Such carbon blacks include, for example, N900 series carbon black, an N800 series carbon black or combinations thereof. Examples of these types of blacks include N880, N907, N908 and N990.

The total amount of carbon black added to particular embodiments of the rubber compositions disclosed herein may range between 70 phr and 120 phr or alternatively between 70 phr and 110 phr, between 70 phr and 100 phr or between 70 phr and 90 phr. In other embodiments the total amount of carbon black may range between 80 phr and 110 phr, between 80 phr and 100 phr, between 80 phr and 90 phr, between 85 phr and 100 phr, between 75 phr and 110 phr or between 90 phr and 100 phr. In particular embodiments of the present invention, the high-structure, low-surface area carbon black may be added in an amount of between 10 wt. % and 90 wt. % of the total amount of carbon black added or alternatively, between 20 wt. % and 90 wt. %, between 25 wt. % and 90 wt. %, between 45 wt. % and 90 wt. %, between 50 wt. % and 80 wt. %, between 60 wt. % and 80 wt. % or between 50 wt. % and 60 wt. % of the total amount of carbon black added to the rubber composition.

In particular embodiments the high-structure, low-surface area carbon black may range from between 15 phr and 70 phr or alternatively between 20 phr and 70 phr, between 20 phr and 60 phr, between 20 phr and 50 phr or between 30 phr and 60 phr with the total amount of carbon black within the ranges disclosed above.

The amount of each of the carbon blacks may be adjusted to provide the desired properties for the sidewall insert. The high-structure, low-surface area carbon black is added to provide the desired rigidity but if too much is added, the hysteresis of the cured rubber composition may be compromised. The low-surface area carbon black is added to provide the desired hysteresis but if too much is added, the rigidity of the cured rubber composition may be compromised. Therefore the ratio of amount of the two carbon blacks added to the rubber composition may be adjusted to provide the desired physical characteristics between rigidity and hysteresis.

In light of this, the weight percent of the high-structure, low-surface area carbon black (based on the total carbon black in the composition) may be adjusted in particular embodiments to provide a rubber composition that may be characterized as having an elongation modulus MA10 (in accordance with ASTM D412) measured at 10% at a temperature of 23° C. of between 7.5 MPa and 10.5 MPa or alternatively between 7.5 MPa and 10 MPa or between 8 MPa and 10 MPa. Furthermore, for particular embodiments, the rubber compositions may be characterized as having hysteresis losses as measured at 60° C. in percent rebound of less than 8% or alternatively, less than 7%. In particular embodiments it is preferred that the hysteresis losses be as low as possible so that the sidewall insert may run as cool as possible under run-flat conditions.

Particular embodiments of the rubber compositions disclosed herein may include other components known to those skilled in the art such as, for example, curing agents, various processing aids, antidegradants, antioxidants or combinations thereof in quantities as known to those having ordinary skill in the art. Curing agents that may be included in the elastomer composition of the present invention include, for example, sulfur, sulfur donors, activators, accelerators, peroxides, and other systems used to effect vulcanization of the elastomer composition.

Flexometer measurements are useful for determining whether the certain materials may be useful for the manufacture of run-flat sidewall inserts. Using a flexometer in accordance with ASTM D623 (Heat Generation and Flexing Fatigue in Compression), the internal temperature and percent creep of the test piece subjected to repeated compression over the test cycle may be measured. If the test piece failed (blowout) from the repeated compression before the end of the three hours, a flex inner temperature was not taken. For particular embodiments of the materials disclosed herein and with similar modulus of elongation as disclosed herein, the materials may be characterized as having a percent creep of less than 8% or alternatively, less than 7% or less than 6%. For particular embodiments of the materials disclosed herein, the materials may be characterized as having an internal temperature at the end of the test cycle (if the test piece did not fail during the test) of less than 210° C. The test conditions pertaining to the flexometer are disclosed below along with the other testing procedures.

The rubber compositions that are disclosed herein may be produced in suitable mixers, such as internal mixers or extruders, in a manner known to those having ordinary skill in the art. Typically two successive preparation phases may be utilized, a first phase of thermo-mechanical working at a high temperature followed by a second phase of mechanical working at a lower temperature.

The first phase of thermo-mechanical working (sometimes referred to as the "non-productive" phase) is intended to mix thoroughly, by kneading, the various ingredients of the compositions with the exception of the vulcanization system, particularly the vulcanizing agents. It is carried out in a suitable mixer until, under the action of the mechanical working and the high shearing imposed on the mixture, a maximum temperature is reached, generally between 120° C. and 190° C. or more narrowly, between 130° C. and 170° C.

After cooling the mixture, a second phase of mechanical working is implemented at a lower temperature. Sometimes referred to as the "productive" phase, this finishing phase consists of incorporation by mixing the vulcanization system, in a suitable device such as an open mill. It is performed for an appropriate time, typically between one and thirty minutes, for example between two and ten minute, and at a sufficiently low temperature lower than the vulcanization temperature of the mixture so as to protect against premature vulcanization.

After the mixing is complete, the rubber composition can be formed into useful articles, including the sidewall supports of run-flat tires. After being formed into its initial shape for being incorporated into the tire and then being incorporated into the tire during the tire building process, the tire is then cured, typically under heat and pressure, to produce the run-flat tire product having a sidewall support insert.

The invention is further illustrated by the following examples, which are to be regarded only as illustrations and not delimitative of the invention in any way. The properties of the compositions disclosed in the examples were evaluated as described below and those utilized methods are suitable for measurement of the claimed and/or described properties of the present invention.

Mooney Viscosity ML (1+4): Mooney Viscosity was measured in accordance with ASTM Standard D1646-04. In general, the composition in an uncured state is placed in a cylindrical enclosure and heated to 100° C. After 1 minute of preheating, the rotor turns within the test sample at 2 rpm, and the torque used for maintaining this movement is measured after 4 minutes of rotation. The Mooney Viscosity is expressed in "Mooney units."

Modulus of elongation (MPa) was measured at 10% (MA10) and at 100% (MA100) at a temperature of 23° C. based on ASTM Standard D412 on dumb bell test pieces. The measurements were taken in the second elongation, i.e., after an accommodation cycle. These measurements are secant moduli in MPa based on the original cross section of the test piece.

Hysteresis losses were measured in percent by rebound at 60° C. at the sixth impact in accordance with the following equation:

$$HL(\%) = 100\{(W_0 - W_1)/W_1\},$$

wherein $W_0$ is the energy supplied and $W_1$ is the energy restored.

Flexometer measurements were taken using a DOLI Ultimate Flexometer manufactured by DOLI Industrie Electronik GMBH of Germany following ASTM test method D-623 (Heat Generation and Flexing Fatigue in Compression) on test pieces that were 25 mm in height with a 17.8 mm diameter. The test was run for three hours at which time an internal temperature of the test piece was recorded as the flex inner temperature. If the test piece failed (blowout) from the repeated compression before the end of the three hours, a flex inner temperature was not taken. The test was run with a chamber temperature of 90° C., with a pre-stress of 2 MPa applied and a stroke of 25% (6.25 mm) at a frequency of 30 Hz. The difference in height of the test piece at the beginning of the test and at the end of the test expressed as a percent of the original height is the flex percent creep.

Example 1

Rubber compositions were prepared using the components shown in Tables 1A and 1B. The amount of each component making up the rubber compositions shown in these Tables are provided in parts per hundred parts of rubber by weight (phr). The tin end-functionalized polybutadiene was NIPOL BR 1250H obtained from Zeon Corporation and had a cis-1,4 content of about 35%.

The high-structure, low-surface area carbon black was S204 obtained from Orion Engineered Carbon. It had a nitrogen surface area of 19 m$^2$/g, an OAN of 138 ml/100 g, a COAN of 76 ml/100 g and an iodine number of 19.6 mg/g.

The additive package was a typical package including 6 PPD, zinc oxide, stearic acid and TMQ. The cure package included accelerators and insoluble sulfur.

TABLE 1A

Rubber Formulations and Physical Properties

|  | F1 | F2 | F3 | F4 | C1 | F5 | F6 | F7 | F8 | C2 |
|---|---|---|---|---|---|---|---|---|---|---|
| NR | 50 | 50 | 50 | 50 | 50 | 50 | 50 | 50 | 50 | 50 |
| BR functionalized | 50 | 50 | 50 | 50 | 50 | 50 | 50 | 50 | 50 | 50 |
| S204 CB | 30 | 30 | 30 | 30 | 30 | 40 | 40 | 40 | 40 | 40 |
| N990 CB | 60 | 70 | 80 | 90 | 100 | 40 | 50 | 60 | 70 | 80 |
| Additives | 9 | 9 | 9 | 9 | 9 | 9 | 9 | 9 | 9 | 9 |
| Cure Package | 6.2 | 6.2 | 6.2 | 6.2 | 6.2 | 6.2 | 6.2 | 6.2 | 6.2 | 6.2 |
| Phys. Properties |  |  |  |  |  |  |  |  |  |  |
| MA10 @23° C. | 7.9 | 8.8 | 9.2 | 9.9 | 11.3 | 8.0 | 8.6 | 9.4 | 10.1 | 10.9 |
| MA100 @ 23° C. | 6.2 | 7.2 | 7.4 | 7.9 | 9.4 | 6.0 | 6.8 | 7.4 | 8.3 | 8.8 |
| Hyst. Loss, % rebound | 5.3 | 6.4 | 6.8 | 7.3 | 7.2 | 5.7 | 6.1 | 7.0 | 7.2 | 8.0 |
| Flex creep, % | 3.3 | 4.2 | 6.4 | 5.5 | 4.1 | 4.5 | 3.3 | 4.0 | 7.1 | 9.6 |
| Flex, Inner Temp, ° C. | 152 | 158 | 175 | 176 | 182 | 154 | 153 | 167 | 178 | 193 |

TABLE 1B

Rubber Formulations and Physical Properties

|  | F9 | F10 | F11 | C3 | F12 | F13 | F14 | C4 | C5 | F15 |
|---|---|---|---|---|---|---|---|---|---|---|
| NR | 50 | 50 | 50 | 50 | 50 | 50 | 50 | 50 | 50 | 50 |
| BR functionalized | 50 | 50 | 50 | 50 | 50 | 50 | 50 | 50 | 50 | 50 |
| S204 CB | 50 | 50 | 50 | 50 | 60 | 60 | 60 | 60 | 60 | 70 |

TABLE 1B-continued

Rubber Formulations and Physical Properties

|  | F9 | F10 | F11 | C3 | F12 | F13 | F14 | C4 | C5 | F15 |
|---|---|---|---|---|---|---|---|---|---|---|
| N990 CB | 30 | 40 | 50 | 60 | 10 | 20 | 30 | 40 | 50 | 10 |
| Additives | 9 | 9 | 9 | 9 | 9 | 9 | 9 | 9 | 9 | 9 |
| Cure Package | 6.2 | 6.2 | 6.2 | 6.2 | 6.2 | 6.2 | 6.2 | 6.2 | 6.2 | 6.2 |
| Phys. Properties | | | | | | | | | | |
| MA10 @23° C. | 7.5 | 8.8 | 10.2 | 10.9 | 8.5 | 9.3 | 10.1 | 10.8 | 11.8 | 10.0 |
| MA100 @ 23° C. | 5.7 | 6.9 | 8.6 | 8.9 | 6.5 | 7.6 | 8.2 | 8.9 | 9.9 | 8.2 |
| Hyst. Loss, % rebound | 5.4 | 7.1 | 7.3 | 8.5 | 7.2 | 7.2 | 7.9 | 8.1 | 9.1 | 7.8 |
| Flex creep, % | 6.2 | 6.0 | 7.1 | 9.1 | 6.0 | 6.0 | 6.5 | 9.2 | 11.6 | 9.2 |
| Flex, Inner Temp, ° C. | 167 | 172 | 180 | 191 | 166 | 172 | 166 | 192 | 196 | 181 |

The rubber compositions were prepared in a Banbury mixer by mixing the components given in Table 1, except for the cure package, in a mixer until all components were well dispersed and a temperature of between 130° C. and 170° C. was reached. The cure package was added in a second phase on a mill. Curing was effected at 150° C. for twenty-five minutes.

The compositions F1-F15 have amounts of the S204 and N990 carbon blacks to provide an MA10 of between 7.5 MPa and 10.5 MPa. The compositions C1-C5 include a mix of the carbon blacks that fall outside of that range of MA10. However, it should be noted that particular embodiments that would include rubber compositions having a higher rigidity may include these higher-rigidity compositions as useful embodiments.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A run-flat tire having a sidewall support, the sidewall support manufactured from a rubber composition that is based upon a cross-linkable elastomer composition, the cross-linkable elastomer composition comprising, per 100 parts by weight of rubber:
a tin end-functionalized polybutadiene rubber;
a second rubber component;
a first carbon black, the first carbon black being a low-surface area, high-structure carbon black having a nitrogen surface area of between 15 $m^2/g$ and 25 $m^2/g$ and a COAN of between 65 ml/100 g and 85 ml/100 g; and
a second carbon black, the second carbon black being a low-surface area carbon black having a nitrogen surface area of greater than 0 $m^2/g$ and 11 $m^2/g$, wherein a total loading of the first and second carbon blacks is between 70 phr and 120 phr and wherein the first carbon black is between 20 wt. % and 90 wt. % of the total loading of the first and second carbon blacks.

2. The run-flat tire of claim 1, wherein the total loading of the first and second carbon blacks is between 70 phr and 110 phr.

3. The run-flat tire of claim 1, wherein the first carbon black is between 25 wt. % and 85 wt. % of the total loading of the first and second carbon blacks.

4. The run-flat tire of claim 1, wherein the first carbon black is between 25 wt. % and 70 wt. % of the total loading of the first and second carbon blacks.

5. The run-flat tire of claim 1, wherein an OAN of the first carbon black is between 100 ml/100 g and 150 ml/100 g.

6. The run-flat tire of claim 1, wherein an iodine number of the first carbon black is between 10 mg/g and 25 mg/g.

7. The run-flat tire of claim 1, wherein the cross-linkable elastomer composition comprises between 30 phr and 70 phr of the tin end-functionalized polybutadiene rubber.

8. The run-flat tire of claim 1, wherein the cross-linkable elastomer composition comprises between 40 phr and 60 phr of the tin end-functionalized polybutadiene rubber.

9. The run-flat tire of claim 1, wherein the second rubber component is selected from the group consisting of polybutadienes, polyisoprenes, natural rubber, butadiene copolymers, isoprene copolymers and mixtures thereof.

10. The run-flat tire of claim 1, wherein the second rubber component is natural rubber.

11. The run-flat tire of claim 1, wherein the first carbon black is included in an amount to provide a modulus of elongation at 10% measured at 23° C. of between 7.5 MPa and 10.5 MPa.

12. The run-flat tire of claim 1, wherein the first carbon black is included in an amount to provide a modulus of elongation at 10% measured at 23° C. of between 8 MPa and 10 MPa.

13. The run-flat tire of claim 1, wherein the second carbon black has a nitrogen surface area of between 2 $m^2/g$ and 11 $m^2/g$.

14. The run-flat tire of claim 13, wherein the first carbon black is included in an amount to provide a modulus of elongation at 10% measured at 23° C. of between 8 MPa and 10 MPa.

15. The run-flat tire of claim 13, wherein the cross-linkable elastomer composition comprises between 30 phr and 70 phr of the tin end-functionalized polybutadiene rubber.

16. The run-flat tire of claim 13, wherein the second rubber component is natural rubber.

17. The run-flat tire of claim 13, wherein the first carbon black has an OAN of between 100 ml/100 g and 150 ml/100 g and an iodine number of between 10 mg/g and 25 mg/g.

18. The run-flat tire of claim 13, wherein the cross-linkable elastomer composition comprises between 40 phr and 60 phr of the tin end-functionalized polybutadiene rubber.

19. The run-flat tire of claim 18, wherein the first carbon black has a nitrogen surface area of between 17 $m^2/g$ and 22 $m^2/g$ and a COAN of between 70 ml/100 g and 80 ml/100 g.

20. A run-flat tire having a sidewall support, the sidewall support manufactured from a rubber composition that is based upon a cross-linkable elastomer composition, the cross-linkable elastomer composition comprising, per 100 parts by weight of rubber:

a tin end-functionalized polybutadiene rubber;

a second rubber component selected from the group consisting of polybutadienes, polyisoprenes, natural rubber, butadiene copolymers, isoprene copolymers and mixtures thereof;

a first carbon black, the first carbon black being a low-surface area, high-structure carbon black having a nitrogen surface area of between 15 $m^2/g$ and 25 $m^2/g$ and a COAN of between 65 ml/100 g and 85 ml/100 g; and a second carbon black, the second carbon black being a low-surface area carbon black having a nitrogen surface area of between 2 $m^2/g$ and 11 $m^2/g$, wherein a total loading of the first and second carbon blacks is between 70 phr and 120 phr, wherein the first carbon black is between 10 wt. % and 90 wt. % of the total loading of the first and second carbon blacks, and wherein the first carbon black is included in an amount to provide a modulus of elongation at 10% measured at 23° C. of between 7.5 MPa and 10.5 MPa.

\* \* \* \* \*